(12) United States Patent
Minotani et al.

(10) Patent No.: US 12,158,389 B2
(45) Date of Patent: Dec. 3, 2024

(54) LOOSENESS DETECTION DEVICE AND LOOSENESS DETECTION METHOD

(71) Applicant: Nippon Telegraph and Telephone Corporation, Tokyo (JP)

(72) Inventors: Tadashi Minotani, Musashino (JP); Masayuki Tsuda, Musashino (JP); Eri Matsunaga, Musashino (JP); Masahito Nakamura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 427 days.

(21) Appl. No.: 17/617,535

(22) PCT Filed: Jun. 13, 2019

(86) PCT No.: PCT/JP2019/023499
§ 371 (c)(1),
(2) Date: Dec. 8, 2021

(87) PCT Pub. No.: WO2020/250382
PCT Pub. Date: Dec. 17, 2020

(65) Prior Publication Data
US 2022/0244138 A1 Aug. 4, 2022

(51) Int. Cl.
| | | |
|---|---|---|
| *G01L 5/24* | (2006.01) | |
| *F16B 31/02* | (2006.01) | |
| *G01M 13/00* | (2019.01) | |
| *G01N 27/04* | (2006.01) | |
| *G01H 13/00* | (2006.01) | |

(52) U.S. Cl.
CPC ............ *G01L 5/243* (2013.01); *F16B 31/028* (2013.01); *G01M 13/00* (2013.01); *G01N 27/04* (2013.01); *F16B 31/02* (2013.01); *G01H 13/00* (2013.01)

(58) Field of Classification Search
CPC ........... G01L 5/24; G01L 5/243; G01N 27/04; G01M 13/00; G01H 13/00; F16B 31/028; F16B 31/02
See application file for complete search history.

(56) References Cited

FOREIGN PATENT DOCUMENTS

| | | | |
|---|---|---|---|
| DE | 102009043267 A1 * | 4/2011 | ............ F16B 31/028 |
| JP | S50-48518 A | 4/1975 | |
| JP | 2013-122418 A | 6/2013 | |
| JP | 2015-59819 A | 3/2015 | |

OTHER PUBLICATIONS

J. H. Park et al., *Image-based Bolt-loosening Detection Technique of Bolt Joint in Steel Bridges*, 6th International Conference on Advances in Experimental Structural Engineering, 11th International Workshop on Advanced Smart Materials and Smart Structures Technology, Aug. 1, 2015, pp. 1-8.

* cited by examiner

*Primary Examiner* — Benjamin R Schmitt
(74) *Attorney, Agent, or Firm* — Workman Nydegger

(57) ABSTRACT

A loosening detection device according to the present embodiment includes multiple washers having holes that allow bolts to pass therethrough, and including metals insulated from each other, a transmission line that electrically connects between the metals and between the metals of the washers, and a transmission line that includes a terminal pair at one end thereof, and that has the other end electrically connected to the metals of the washer. A resonance frequency is measured from the terminal pair to detect loosening of the bolts on the basis of a change in the resonance frequency.

5 Claims, 3 Drawing Sheets

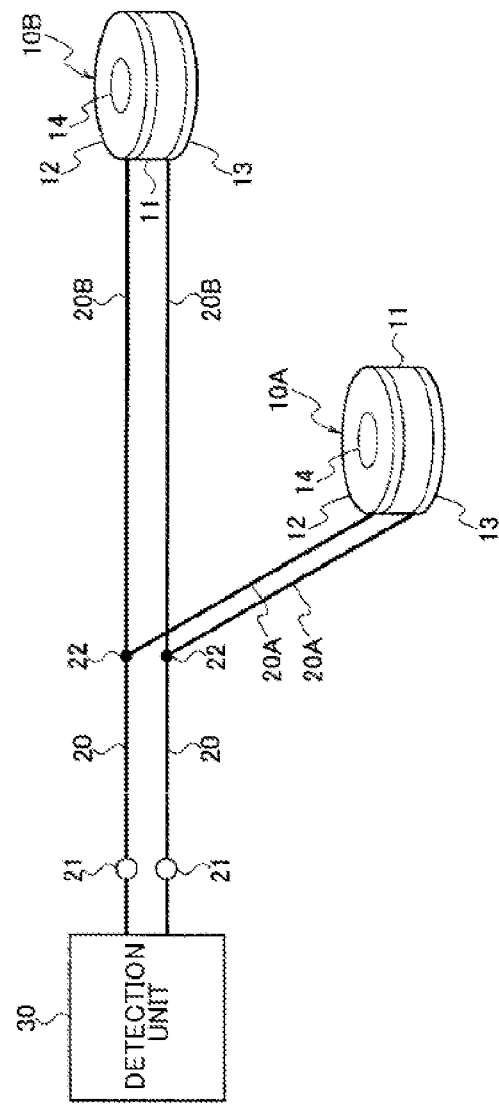

LOOSENESS DETECTION DEVICE AND LOOSENESS DETECTION METHOD

TECHNICAL FIELD

The present invention relates to a loosening detection device and a loosening detection method.

BACKGROUND ART

Bolts and nuts that are used as fasteners for steel materials in structures including steel bridges and towers can loosen due to vibrations of the structures, thus triggering a serious accident. One method for detecting loosening of such a bolt and nut is to mark the angle in the rotation axis direction when the bolt and nut have been fixed. NPL 1 indicates detecting loosening of the bolt and nut by image analysis.

CITATION LIST

Non Patent Literature

[NPL 1] J. H. Park, T. H. Kim, J. T. Kim, "Image-based Bolt-loosening Detection Technique of Bolt Joint in Steel Bridges", 6th International Conference on Advances in Experimental Structural Engineering, 11th International Workshop on Advanced Smart Materials and Smart Structures Technology, Aug. 1-2, 2015, University of Illinois, Urbana-Champaign, United States

SUMMARY OF THE INVENTION

Technical Problem

The method for detecting loosening by image recognition requires an inspector to come near such a fastener, to a location that allows the image recognition, and this method is, unfortunately, difficult to use in inspection of the fastener installed under a steel bridge or in an upper part of a steel tower. Besides, in the case where the bolt loosens such that it rotates by an integer-multiple of 360 degrees, this might erroneously be determined as no loosening. In addition, it is unclear which of the bolt and nut rotates, thus requiring both of the bolt and nut to be inspected. Furthermore, a mark added to the bolt or nut attached to an outdoor structure is likely to deteriorate and become invisible due to ultraviolet rays or wind and snow.

The present invention is made with the foregoing in view, and an object thereof is to detect loosening of the fastener installed in a location that obstructs visual inspection.

Means for Solving the Problem

A loosening detection device according to one aspect of the present invention includes multiple washers having holes that allow fasteners to pass therethrough, and including first metal members and second metal members insulated from each other, a first transmission line that electrically connects between the first metal members of the washers and between the second metal members of the washers, and a second transmission line that includes a terminal pair at one end thereof, and that has an other end electrically connected to the first metal member and the second metal member of one of the washers. A resonance frequency is measured from the terminal pair to detect loosening of the fasteners on the basis of a change in the resonance frequency.

A loosening detection method according to one aspect of the present invention in which multiple fasteners are respectively passed through multiple washers having holes that allow the fasteners to pass therethrough and including first metal members and second metal members insulated from each other, and the fasteners are then tightened, and in a state where the fasteners tighten, the first metal members and the second metal members are electrically connected, the method including electrically connecting between the first metal members of the washers and between the second metal members of the washers by means of a first transmission line, electrically connecting a second transmission line including a terminal pair at one end thereof to the first metal member and the second metal member of one of the washers, at an other end thereof, and measuring a resonance frequency from the terminal pair to detect loosening of the fasteners on the basis of a change in the resonance frequency.

Effects of the Invention

The present invention is capable of detecting loosening of fasteners installed in a location that obstructs visual inspection.

BRIEF DESCRIPTION OF DRAWINGS

FIG. 3 illustrates the configuration of a loosening detection device according to a second embodiment.

DESCRIPTION OF EMBODIMENTS

First Embodiment

Figure 1:
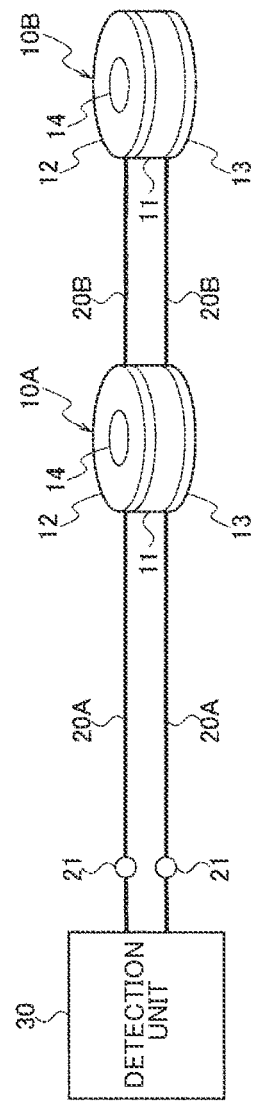
FIG. 1 illustrates the configuration of a loosening detection device according to a first embodiment.

FIG. 1 indicates a loosening detection device 1 according to a first embodiment. The loosening detection device 1 indicated in the figure includes two washers 10A and 10B, transmission lines 20A and 20B, and a detection unit 30.

The washers 10A and 10B include insulators 11 and front and back metals 12 and 13 insulated from each other with the insulators 11 therebetween. The washers 10A and 10B have holes 14 in the center thereof. The holes 14 are provided through the insulators 11 and the metals 12 and 13, and allow fasteners such as bolts or screws to pass therethrough.

The transmission lines 20A and 20B are pairs of electrical wires. Transmission line 20A is electrically connected to each of the metals 12 and 13 of the washer 10A. Transmission line 20B electrically connects between the metals 12 and between the metals 13 of the washer 10A and the washer 10B. The transmission lines 20A and 20B have different lengths.

The detection unit 30 is connected to a terminal pair 21 of the transmission line 20A that is not connected to the washer 10A. The detection unit 30 detects loosening of the fasteners passed through the washer 10A and the washer 10B on the basis of changes over time in a resonance frequency derived on the basis of a peak value of frequency response of electrical characteristics between the terminal pair.

Figure 2:
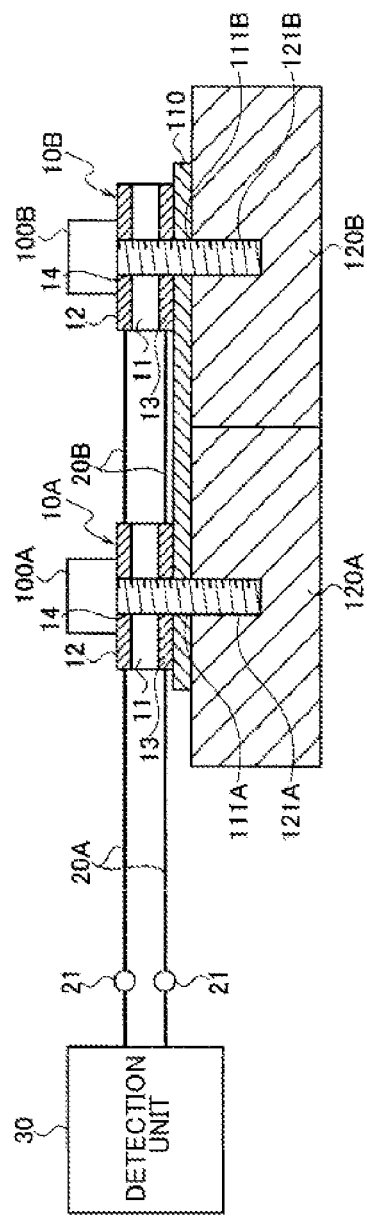
FIG. 2 illustrates the state of the loosening detection device in use.

FIG. 2 indicates the state of the loosening detection device 1 according to the present embodiment in use.

In FIG. 2, metal bolts 100A and 100B and a metal plate 110 are used to fasten a steel material 120A and a steel material 120B. The steel materials 120A and 120B respectively include screw holes 121A and 121B that allow the bolts 100A and 100B to be inserted thereinto. The metal plate 110 includes two through holes 111A and 111B that allow the bolts 100A and 100B to pass therethrough, in positions corresponding to the screw holes 121A and 121B. The bolt 100A is passed through the washer 10A and through the through hole 111A of the metal plate 110, inserted into the screw hole 121A of the steel material 120A, and then tightened. The bolt 100B is passed through the washer 10B and through the through hole 111B of the metal plate 110, inserted into the screw hole 121B of the steel material 120B, and then tightened. Meanwhile, the bolts 100A and 100B may have a length that allows these bolts to penetrate the steel materials 120A and 120B, and may be fixed with nuts.

In the case where both of the bolts 100A and 100B are correctly tightened, the heads of the bolts 100A and 100B respectively come in electrical contact with the metals 12 of the washers 10A and 10B. In addition, the bolts 100A and 100B each come in electrical contact with the metal plate 110, and the metal plate 110 comes in electrical contact with the metal 13 of each of the washers 10A and 10B.

In the case where the bolt 100A loosens, the head of the bolt 100A comes away from the metal 12 of the washer 10A, and the metal 12 and the metal 13 of the washer 10A are brought into a state of being electrically disconnected from each other. In the case where the bolt 100B loosens, the head of the bolt 100B comes away from the metal 12 of the washer 10B, and the metal 12 and the metal 13 of washer 10B are brought into a state of being electrically disconnected from each other. This is a state of electrical disconnection. In the case where the bolt 100A and 100B loosen to cause the metal plate 110 to come away from the washers 10A and 10B, the metal plate 110 and the metal 13 are brought into a state of being electrically disconnected from each other, and the metals 12 and the metals 13 of washers 10A and 10B are brought into a state of being electrically disconnected from each other.

When the detection unit 30 propagates electromagnetic waves from the terminal pair 21, reflection of the electromagnetic waves takes place in the bolt 100A. Because of the contact resistance between the bolt 100A, the washer 10A, and the metal plate 110, and the resistance and inductance of the bolt 100A per se, the bolt 100A does not serve as a complete short circuit with an impedance of zero. Some of the electromagnetic waves are propagated on the transmission line 20B to reach the bolt 100B.

Next, the following explains a method for detecting, by using the loosening detection device 1 according to the present embodiment, a state where the bolt 100B loosens as transitioned from a state where the bolts 100A and 100B tighten, a state where the bolt 100A loosens as transitioned from a state where the bolts 100A and 100B tighten, and a state where the both of the bolts 100A and 100B loosen.

In the case where the bolts 100A and 100B tighten, the impedance at the bolt 100B is low, and the impedance Z2 seen from the bolt 100A toward the transmission line 20B is inductive.

In the case where the bolt 100B loosens while the bolt 100A is in the state of tightening, the impedance at the bolt 100B is high, and the impedance Z2 seen from the bolt 100A toward the transmission line 20B is capacitive.

As the impedance Z2 changes between inductive and capacitive, the frequency (resonance frequency) of a standing wave as observed on the transmission line 20A also changes. Accordingly, the detection unit 30 is capable of detecting loosening of the bolt 100B occurring while the bolt 100A tightens by causing the terminal pair 21 to propagate electromagnetic waves, deriving a resonance frequency on the basis of a peak value of frequency response of electrical characteristics between the terminal pair, and detecting a change in the resonance frequency.

In the case where a state where the bolts 100A and 100B tighten changes to a state where the bolt 100A loosens, the reflection takes place a little in the bolt 100A and most in the bolt 100B, thus changing the resonance frequency. Accordingly, the detection unit 30 is capable of detecting loosening of the bolt 100A occurring while the bolt 100B tightens by detecting a change in the resonance frequency.

A standing wave that is observed in the state where both of the bolts 100A and 100B loosen has an anti-node at the location of the bolt 100B and a node at a location that corresponds to the half of the sum of the lengths of the transmission line 20A and the transmission line 20B. If the transmission line 20A and the transmission line 20B have identical lengths, then the node would be the location of the bolt 100A. Thus the resonance frequency would not change according to tightening or loosening of the bolt 100A. Accordingly, the transmission line 20A and the transmission line 20B should be made to have different lengths.

As has been explained above, the loosening detection device 1 according to the present embodiment includes the two washers 10A and 10B having the metals 12 and 13 insulated with the insulators 11 therebetween. The metals 12 and 13 of the washer 10A are connected to the transmission line 20A including the terminal pair 21. The transmission line 20B connects between the metals 12 and between the metals 13 of the two washers 10A and 10B. The metal bolts 100A and 100B are passed through the washers 10A and 10B to fasten the steel materials 120A and 120B, and thus electrically connects between the washers 10A and 10B. The detection unit 30 is connected to the terminal pair 21 to detect a change in the resonance frequency. This enables detection of loosening of the bolts 100A and 100B even if the bolts 100A and 100B cannot be observed visually.

Second Embodiment

FIG. 3 indicates a loosening detection device 1 according to a second embodiment. The loosening detection device 1 indicated in the figure includes a transmission line 20 including a terminal pair 21 at one end and a branch point 22 at the other end. Connected to the branch point 22 are a transmission line 20A and a transmission line 20B. The transmission line 20A is connected to a washer 10A, and the transmission line 20B to a washer 10B. The transmission lines 20A and 20B have different lengths. The washer 10A and the washer 10B have the same configuration as in the first embodiment.

The state of the loosening detection device 1 according to the second embodiment in use is the same as in the first embodiment; specifically, bolts 100A and 100B of which loosening is the target of detection are used by being passed through the washers 10A and 10B.

The detection unit 30 propagates electromagnetic waves from the terminal pair 21 toward the transmission line 20. The frequency (resonance frequency) of a standing wave that is observed on the transmission line 20A changes in accordance with the state of the bolt 100A passed through the washer 10A, that is, whether the bolt 100A is in the state of tightening or loosening. The frequency (resonance frequency) of a standing wave that is observed on the transmission line 20B changes in accordance with the state of the bolt 100B passed through the washer 10B, that is, whether the bolt 100B is in the state of tightening or loosening. The frequencies of the standing waves that are observed on the transmission lines 20A and 20B can be changed according to the lengths of the transmission lines 20A and 20B. Thus making different the lengths of the transmission line 20A and the transmission line 20B enables the resonance frequency to be set to correspond to the states of the bolt 100A and the 100B.

In the following, the length of the transmission line 20A is represented by $Lt1$, the length of the transmission line 20B by $Lt2$, the characteristic impedance of the transmission lines 20A and 20B by $Z_0$, and the propagation constant of the transmission lines 20A and 20B by $\gamma$. When the bolts 100A and 100B are each in the state of tightening, the impedances $Z1$ and $Z2$ seen from the branch point 22 toward the transmission line 20A and the transmission line 20B are represented by the formula (1) and formula (2) respectively.

Expression 1

$$Z1 = Zo\ \tanh(\gamma Lt1) \quad (1)$$

$$Z2 = Zo\ \tanh(\gamma Lt2) \quad (2)$$

At the branch point 22, $Z1$ and $Z2$ are connected in parallel, and thus the total impedance $Zt$ is represented by the formula (3).

Expression 2

$$Zt = \frac{Z1\ Z2}{Z1 + Z2} = Zo\frac{\tanh(\gamma Lt1)\tanh(\gamma Lt2)}{\tanh(\gamma Lt1) + \tanh(\gamma Lt2)} \quad (3)$$
$$= Zo\frac{\sinh(\gamma Lt1)\sinh(\gamma Lt2)}{\sinh(\gamma Lt1)\cosh(\gamma Lt2) + \cosh(\gamma Lt1)\sinh(\gamma Lt2)}$$
$$= \frac{Zo}{2}\frac{\cosh\{\gamma(Lt1 + Lt2)\} - \cosh\{\gamma(Lt1 - Lt2)\}}{\sinh\{\gamma(Lt1 + Lt2)\}}$$

When the bolt 100A loosens while the bolt 100B is in the state of tightening, the impedance $Z1$ of the transmission line 20A is represented by the formula (4), and the total impedance $Zt$ is represented by the formula (5).

Expression 3

$$Z1 = Zo\ \coth(\gamma Lt1) \quad (4)$$
$$Zt = Zo\frac{\coth(\gamma Lt1)\tanh(\gamma Lt2)}{\coth(\gamma Lt1) + \tanh(\gamma Lt2)}$$
$$= \frac{Zo}{2}\frac{\sinh\{\gamma(Lt1 + Lt2)\} - \sinh\{\gamma(Lt1 - Lt2)\}}{\cosh\{\gamma(Lt1 + Lt2)\}} \quad (5)$$

When the bolt 100B loosens while the bolt 100A is in the state of tightening, the impedance $Z2$ of the transmission line 20B is represented by the formula (6), and the total impedance $Zt$ is represented by the formula (7).

Expression 4

$$Z2 = Zo\ \coth(\gamma Lt2) \quad (6)$$
$$Zt = Zo\frac{\tanh(\gamma Lt1)\coth(\gamma Lt2)}{\tanh(\gamma Lt1) + \coth(\gamma Lt2)}$$
$$= \frac{Zo}{2}\frac{\sinh\{\gamma(Lt1 + Lt2)\} + \sinh\{\gamma(Lt1 - Lt2)\}}{\cosh\{\gamma(Lt1 + Lt2)\}} \quad (7)$$

When both of the bolt 100A and the bolt 100B loosen, the total impedance $Zt$ is represented by the formula (8).

Expression 5

$$Zt = Zo\frac{\coth(\gamma Lt1)\coth(\gamma Lt2)}{\coth(\gamma Lt1) + \coth(\gamma Lt2)} \quad (8)$$
$$= \frac{Zo}{2}\frac{\cosh\{\gamma(Lt1 + Lt2)\} + \cosh\{\gamma(Lt1 - Lt2)\}}{\sinh\{\gamma(Lt1 + Lt2)\}}$$

On the basis of the formula (3), formula (5), formula (7), formula (8), if $Lt1 \neq Lt2$, then the total impedance $Zt$ has different characteristics in the four states of the combination of tightening and loosening of the bolt 100A and the bolt 100B.

As found above, the combination of tightening and loosening of the bolt 100A and the bolt 100B can be detected by measuring impedance characteristics. The numerators in the rational functions of the impedance are particularly different, and thus on measuring the resonance frequency that is a frequency at which the admittance exhibits a peak, the combination of tightening and loosening of the bolt 100A and the 100B can be detected.

Meanwhile, in either of the first and second embodiments, three or more washers may be used.

REFERENCE SIGNS LIST

1 Loosening detection device
10A, 10B Washer
11 Insulator
12, 13 Metal
14 Hole
20, 20A, 20B Transmission line
21 Terminal pair
22 Branch point
30 Detection unit

The invention claimed is:

1. A loosening detection device comprising:
a first washer and a second washer each having holes that allow fasteners to pass therethrough, and including first metal members and second metal members insulated from each other;
a first transmission line that electrically connects between the first metal members of the first and second washers and between the second metal members of the first and second washers, the first transmission line including a pair of electrical wires, a first wire of the pair of electrical wires having a first end that connects to the first metal member of the first washer and a second end that connects to the first metal member of the second washer, a second wire of the pair of electrical wires having a first end that connects to the second metal member of the first washer second end that connects to the second metal member of the second washer; and
a second transmission line that includes a terminal pair at one end thereof, and that has an other end electrically connected to the first metal member and the second metal member of one of the first and second washers, the second transmission line including a pair of electrical wires, a first wire of the pair of electrical wires having a first end that connects to a first one of the terminal pair and a second that connects to the first metal member of the first washer, a second wire of the pair of electrical wires having a first end that connects to a second one of the terminal pair and a second end that connects to the second metal member of the first washer, wherein a resonance frequency is measured from the terminal pair to detect loosening of the fasteners on the basis of a change in the resonance frequency.

2. The loosening detection device according to claim 1, wherein the first transmission line and the second transmission line have different lengths.

3. The loosening detection device according to claim 1, wherein the other end of the second transmission line is connected to a branch point located midway in the first transmission line, and distances from the branch point to the individual washers are different.

4. A loosening detection method, in which first and second fasteners are tightened after respectively passed through first and second washers having holes that allow the first and second fasteners to pass therethrough and including first metal members and second metal members insulated from each other, the method comprising:

electrically connecting between the first metal members of the first and second washers and between the second metal members of the first and second washers by means of a first transmission line, the transmission line including a pair of electrical wires, a first wire of the pair of electrical wires having a first end that connects to the first metal member of the first washer and a second end that connects to the first metal member of the second washer, a second wire of the pair of electrical wires having a first end that connects to the second metal member of the first washer and a second end that connects to the second metal member of the second washer;

electrically connecting a second transmission line including a terminal pair at one end thereof to the first metal member and the second metal member of one of the first and second washers, at an other end thereof, the second transmission line including a pair of electrical wires, a first wire of the pair of electrical wires having a first end that connects to a first one of the terminal pair second end that connects to the first metal member of the first washer, a second wire of the pair of electrical wires having a first end that connects a second one of the terminal pair and a second end that connects to the second metal member of the first washer; and measuring a resonance frequency from the terminal pair to detect loosening of the fasteners on the basis of a change in the resonance frequency.

5. The loosening detection method according to claim 4, including measuring a resonance frequency from a branch point located midway in the first transmission line.

\* \* \* \* \*